(12) United States Patent
Jordan

(10) Patent No.: US 6,396,916 B2
(45) Date of Patent: May 28, 2002

(54) CLIP-ON FRAUD PREVENTION METHOD AND APPARATUS

(75) Inventor: David Jordan, Alexandria, VA (US)

(73) Assignee: MCI Communications Corporation, Washington, DC (US)

(*) Notice: Subject to any disclaimer, the term of this patent is extended or adjusted under 35 U.S.C. 154(b) by 0 days.

(21) Appl. No.: 08/987,935

(22) Filed: Dec. 10, 1997

(51) Int. Cl.⁷ .............................................. H04M 11/00
(52) U.S. Cl. ................................... 379/189; 379/93.02
(58) Field of Search ........................... 379/91.01, 91.02, 379/93.02, 93.03, 93.04, 357, 188, 189, 357.01–357.05; 340/825.34; 380/23, 28

(56) References Cited

U.S. PATENT DOCUMENTS

| | | | | |
|---|---|---|---|---|
| 4,920,567 A | * | 4/1990 | Malek | 380/33 |
| 5,216,517 A | * | 6/1993 | Kinoshita et al. | 358/400 |
| 5,353,331 A | * | 10/1994 | Emery et al. | 455/461 |
| 5,406,619 A | * | 4/1995 | Akhter uzzaman et al. | 379/93.02 |
| 5,455,861 A | * | 10/1995 | Faucher et al. | 380/9 |
| 5,521,966 A | * | 5/1996 | Friedes et al. | 379/91.02 |
| 5,581,607 A | * | 12/1996 | Richardson, Jr. et al. | 379/88.22 |
| 5,586,166 A | * | 12/1996 | Turban | 455/558 |
| 5,740,232 A | * | 4/1998 | Pailles et al. | 379/93.02 |
| 5,787,154 A | * | 7/1998 | Hazra et al. | 379/93.03 |
| 5,878,124 A | * | 3/1999 | Griesmer et al. | 379/201 |
| 5,926,549 A | * | 7/1999 | Pinkas | 713/168 |

OTHER PUBLICATIONS

"Accessories," URL:http://www.paxton–access.co.uk/access.html, ©Paxton Access Ltd., pp. 1–3, undated.

"ASP Advantage Series Proximity™ Readers," URL:http://www.mot.com/LMPS/Indala/as readers.html, Motorola, Inc., pp. 1–6, undated.

"Keypad systems—All electronics in the keypad," URL:http://www.paxton–access.co.uk/key1.html, ©Paxton Access Ltd., pp. 1–2, undated.

"Keypad systems—Electronics in a separate control unit," URL:http://www.paxton–access.co.uk/key2.html, ©Paxton Access Ltd., pp. 1–4, undated.

(List continued on next page.)

Primary Examiner—Fan Tsang
Assistant Examiner—Roland G. Foster

(57) ABSTRACT

Fraud prevention in a telecommunications network using call initiation equipment including intelligence capable of authentication is described. In order to initiate a call via a telecommunications network, the call initiation equipment sends authentication data to an adjunct platform. The adjunct platform uses the authentication data to determine if the call initiation equipment is authorized to use the customer wireline that interconnects the call initiation equipment to the telecommunications network.

30 Claims, 3 Drawing Sheets

Authentication Unit Call Set-Up Environment

OTHER PUBLICATIONS

"Magstripe cards," URL:http://www.paxton–access.co.uk/magcards.html, ©Paxton Access Ltd., pp. 1–3, undated.

"Magstripe systems—All electronics in the reader," URL:http://www.paxton–access.co.uk/mag1.html, ©Paxton Access Ltd., p. 1, undated.

"Magstripe systems—Electronics in a separate control unit," URL:http://www.paxton–access.co.uk/mag2.html, ©Paxton Access Ltd., pp. 1–2, undated.

"Network systems," URL:http://www.paxton–access.co.uk/network.html, ©Paxton Access Ltd., pp. 1–3, undated.

"OEM products," URL:http://www.paxton–access.co.uk/oem.html, ©Paxton Access Ltd., p. 1, undated.

"Proximity Access Control Products," URL:http://www.mot.com/LMPS/Indala/prodaccess.html, ©Copyright, 1996, Motorola, Inc., p. 1, undated.

"Proximity systems—Electronics in a separate control unit," URL:http://www.paxton–access.co.uk/prox.html, ©Paxton Access Ltd., p. 1, undated.

"Proximity tokens," URL:http://www.paxton–access.co.uk/proxtok.html, ©Paxton Access Ltd., p. 1, undated.

"Trade supplies," URL:http://www.paxton–access.co.uk/trade.html, ©Paxton Access Ltd., pp. 1–2, undated.

"Why Choose Indala Proximity for Access Control?," URL:http://www.mot.com/LMPS/Indala/whyindala.html, ©Copyright 1994, Motorola, Inc., p. 1. undated.

* cited by examiner

CLIP-ON FRAUD PREVENTION METHOD AND APPARATUS

BACKGROUND OF THE INVENTION

1. Field of the Invention

The present invention relates generally to anti-fraud devices for use in telecommunications networks and, more particularly, to a system and method for preventing clip-on fraud using telephone authentication.

2. Related Art

Anti-fraud devices are used in telecommunications networks to prevent calls from being billed to a customer or subscriber that did not authorize the call. Because payment for calls made using traditional local calling and dial-1 long distance telephone is obtained by billing the owner of the telephone for all calls made on the telephone at the end of a month, fraud occurs with these services when someone has access to a telephone and makes a telephone call that they are not authorized to make.

Unauthorized interconnection with a customer's wireline or private exchange equipment is referred to as clip-on fraud. Private exchanges provide switching capabilities to a large number of telephones or other telecommunications network access equipment, such as personal computers, that are owned by one private entity. Clip-on fraud occurs by an unauthorized individual attaching their telecommunications equipment to the wires that interconnect the authorized customer's telecommunications equipment to the central office switch. A central office switch is a switch that provides access to the telecommunications network and switching capability for local calls.

Clip-on fraud allows a user of equipment that is clipped-onto a customer's telephone lines to place as many unauthorized calls as he or she wishes. Because calls from privately owned telephones are typically billed to an account associated with the telephone at the end of each month, the owner of the telephone may not be aware of the unauthorized access until the end of the month. In addition, because calls can be made from privately owned telephones without the caller In demonstrating authorization, the owner of the telephone is unable to prevent fraud occurring via an unauthorized access to their telephone lines.

A telecommunications company's ability to detect clip-on fraud is limited. Telecommunications companies currently do not have the capability to determine what equipment is authorized to interconnect with a customer's wirelines. Using calling patterns to detect clip-on fraud is not helpful because a large volume of calls made with a telephone may not be detectable as unusual.

The charges for the unauthorized services are most often billed to the authorized customer who must convince the telecommunications company that he or she has not made the calls. The authorized customer must prove that he or she did not make the calls, pay any long distance charges, and then approach the long distance company for compensation. Clip-on fraud places a burden on the customer who may have little technical ability to resolve the unauthorized interconnection. The charges jeopardize the credit worthiness of the victim and may result in their telephone services being shut-off or being toll restricted.

Current attempts to address clip-on fraud include locking access boxes and attempting to obstruct access to the local network. These attempts do not prevent the problem but only make access slightly more difficult. In addition, millions of access points, such as interconnections, junction boxes, and demarcations, exist. Attempts to secure these points are expensive and often fail as an individual wishing unauthorized access can easily circumvent the locks.

SUMMARY OF THE INVENTION

The present invention includes call initiation equipment that contains intelligence which authenticates the call initiation equipment to the central office switch. Call initiation equipment is equipment that is capable of establishing a call via a telecommunications network. The authentication of the call initiation equipment takes place by providing an appropriate response to a validation request message from the central office switch. The intelligence contained in the call initiation, equipment ensures that it will only operate successfully when used from the authorized customer's wireline.

The use of the validation request message removes the ability of an individual wishing unauthorized access to clip-on to the customer's wireline with a standard analog telephone equipment or other device. The requirement that the call initiation equipment contain intelligence that ensures that it operates successfully only when used from the authorized customer's wireline prevents an individual wishing unauthorized service from being able to make unauthorized calls by physically stealing the customer's phone and using it on another wireline.

The system of the present invention includes call initiation equipment that has an authentication unit that is capable of sending authentication data. The call initiation equipment accesses a telecommunications network via a customer's wireline that interfaces with an exchange. The exchange is connected to an adjunct platform which stores information needed to authenticate the call initiation equipment.

Examples of call initiation equipment include but are not limited to a telephone, a mobile telephone, or a personal computer with a modem. The authentication unit included in the call initiation equipment authenticates the call initiation equipment to the telecommunications network. An authentication unit is intelligence within the call initiation equipment that is capable of sending authentication data, which is data that identifies that the call initiation equipment is authorized to operate on a particular customer's wireline. The customer wireline is a line that connects the telephone or other call initiation equipment with an exchange. Customer wirelines may be copper lines in the ground or carried on telephone poles or fiber optic cable.

An exchange, also referred to as a switch, which is connected to the call initiation equipment via the customer wireline, is a component of the telecommunications network that provides access for call initiation equipment and switching functionality for access to other exchanges and to local call initiation equipment. The exchange is connected to an adjunct platform. An adjunct platform stores the information needed to authenticate the call initiation equipment.

The method of the present invention involves originating a call, using call initiation equipment, to the adjunct platform via an exchange. The adjunct platform responds to the call origination by sending a validation request message to the call initiation equipment, again via an exchange. The call initiation equipment responds to the validation request message by sending authentication data to the adjunct platform via an exchange. The adjunct platform sends a validation response message to the exchange and the exchange either allows the call to be initiated or denies access with either no indication or with an access denied message sent to the call initiation equipment indicating that access is denied.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
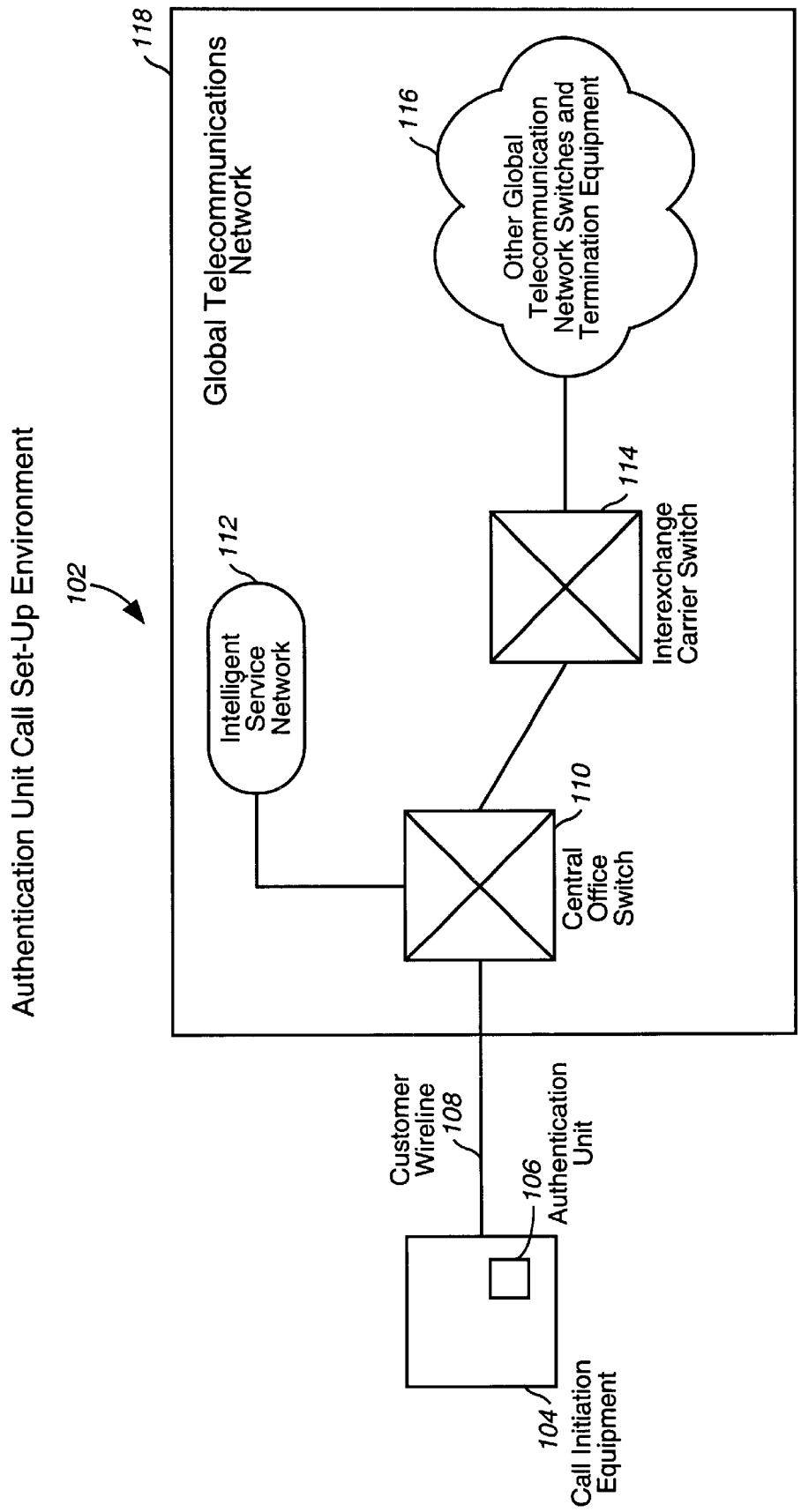
FIG. 1 is a block diagram of an authentication unit call set-up environment according to a preferred embodiment of the present invention.

FIG. 1 is a block diagram of an authentication unit call set-up environment 102 according to an embodiment of the present invention. The authentication unit call set-up environment 102 allows for call set-up by ensuring that the caller is using call initiation equipment 104 that is authorized to be interconnected to the customer's wireline 108.

The authentication unit call set-up environment 102 comprises call initiation equipment 104 that includes an authentication unit 106. The call initiation equipment 104 is interconnected to a central office switch 110 via a wireline 108. The central office switch 110 provides access to the global telecommunications network 118.

Figure 3:
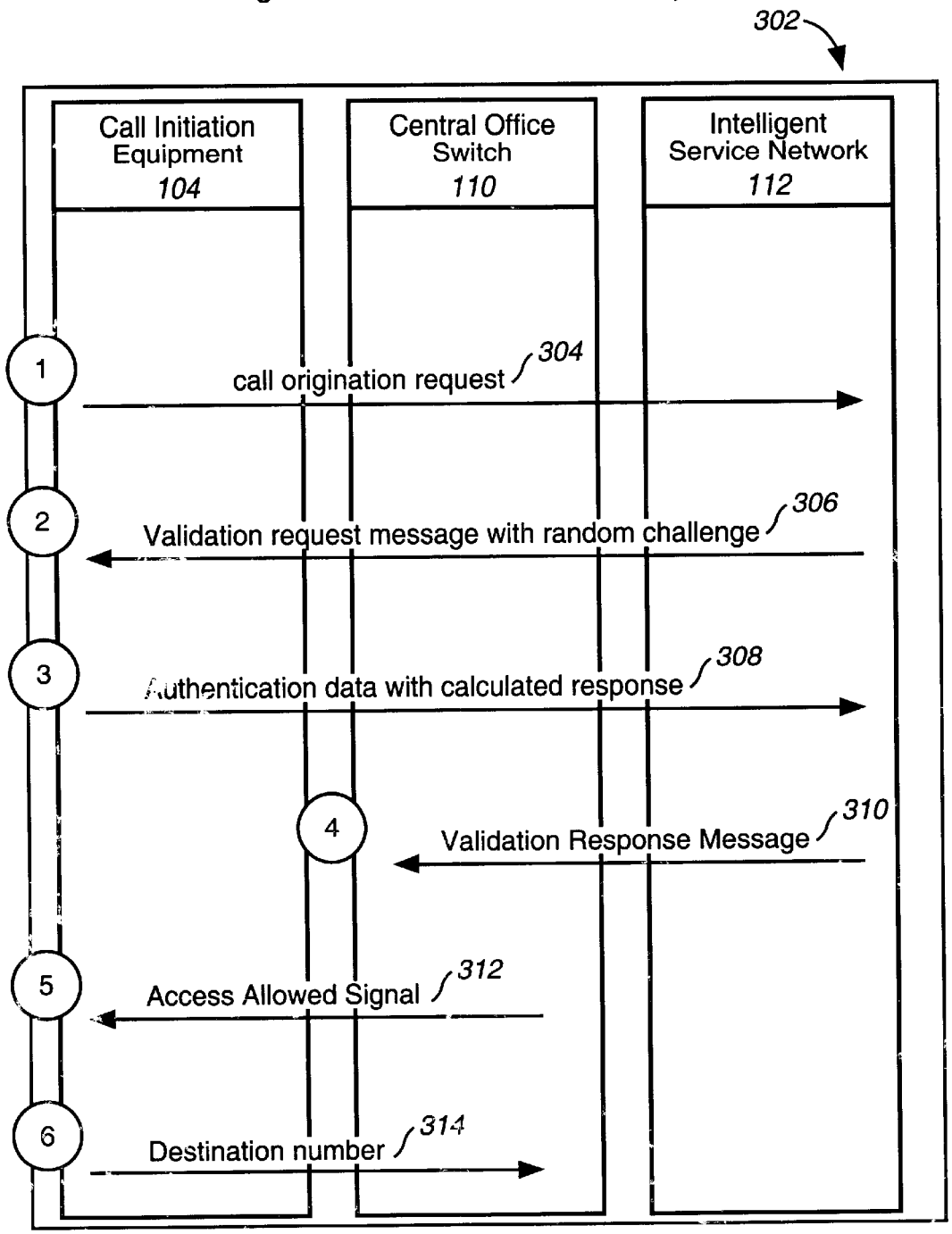
FIG. 3 depicts a flowchart illustrating the messages for authentication unit operation.

The central office switch 110 is interconnected to an adjunct platform, such as intelligent service network (ISN) 112 for authentication of the call initiation equipment 104. The ISN 112 provides a validation request message 306 (of FIG. 3) to the call initiation equipment 104 for authentication.

In addition, the central office switch 110 is interconnected to an interexchange carrier switch 114 for access to other global telecommunications network switches and termination equipment 116. The central office switch 110 is also interconnected to additional call initiation equipment (not shown) and provides switching capability to terminate local calls.

The authentication unit call set-up environment 102 will be described further with respect to an exemplary call. Call initiation equipment 104 is used to initiate a telephone call via customer wireline 108 to the central office switch 110. Call initiation equipment 104 may include, but is not limited to, a telephone, a mobile telephone (also referred to as a wireless telephone), a personal computer or any other equipment that can be used to initiate a call via a telecommunications network. The call initiation equipment 104 includes an authentication unit 106. The authentication unit 106 includes intelligence (implemented using hardware, software, or a combination of hardware and software) needed to authenticate that call initiation equipment 104 is authorized to use customer wireline 108. The authentication unit 106 need not be a particular component within call initiation equipment 104. Authentication unit 106 may be any intelligence that can authenticate call initiation equipment 104. For example, authentication unit 106 can use existing circuitry within call initiation equipment 104 that is used for other functions. Authentication unit 106 can alternatively be a dedicated hardware state machine, or a processor operating according to software. If the authentication unit 106 is outside the call initiation equipment 104, an unauthorized user may be able to interconnect between call initiation equipment 104 and authentication unit 106 and obtain authorization via authentication unit 106. Thus, in embodiments where the authentication unit 106 is outside the call initiation equipment 104, preferably the authentication unit 106 is sufficiently close to call initiation equipment 104, so that it is would be difficult for an unauthorized user to interconnect between call initiation equipment 104 and authentication unit 106. Nevertheless, preferably, authentication unit 106 is within call initiation equipment 104.

Customer wireline 108 carries signals between call initiation equipment 104 and central office switch 110. Customer wireline 108 may be any transmission line that is capable of carrying signals in the telecommunications network. A customer wireline may be, but is not limited to, a cooper wire, fiber optic cable or frequency assignment of a signal that will be received by an antenna. Customer wireline 108 may include other equipment that combines various customers' call initiation equipment prior to reaching the central office switch 110. Examples of equipment that combines wirelines from various customers' call initiation equipment are demarcation blocks, junctions, and other facilities that interconnect wires.

Central office switch 110 is an exchange within a local exchange network. An exchange is a component of a telecommunications network that is capable of providing access to call initiation equipment and switching functionally to other exchanges. Switching functionality allows a call to be routed via a telecommunications network, comprising wirelines and exchanges, to access databases containing information, components that play recordings, or to call initiation equipment used by other customers. A central office is a building or other facility owned by a local exchange network provider. Therefore, an exchange within a central office, such as central office switch 110, is within a local exchange network. A local exchange network comprises switches and termination equipment within a localized area. An example of a local exchange network is a local telephone operating company network such as Bell Atlantic.

The central office switch 110 is interconnected to an ISN 112 which provides authentication of call initiation equipment 104. An ISN 112 is one type of adjunct platform. An adjunct platform provides the capability needed to authorize call initiation equipment 104. The capability needed to authorize call initiation equipment 104 includes the ability to send a validation request message and data to determine whether the authenticating data received from call initiation equipment 104 is valid. In addition, an adjunct platform may need processors that can interact with call initiation equipment 104 by providing translations and querying one or more databases to respond to call initiation equipment 104.

As just noted, ISN 112 is one type of adjunct platform. ISN 112 preferably includes an automated call distributor which accesses automated response units. Automated response units can play messages and obtain data. An automated response unit on ISN 112 can interact with the call initiation equipment to receive and send signals. In addition, the automated response unit can interact with databases on ISN 112 to obtain the data needed to validate call initiation equipment 104. An example intelligent service network is described in further detail in co-pending U.S.

patent application Attorney Docket No. CDR-96-008 (1575.2230000) entitled, "A System and Method for Providing Operator and Customer Services for Intelligent Overlay Networks," assigned to the assignee of the present invention and incorporated herein by reference in its entirety. The adjunct platform may also be implemented as a standalone database on a computer system such as the RISC 6000 manufactured by International Business Machines Corp. (IBM).

After call initiation equipment authentication is complete, if the call is a long-distance call, central office switch 110 sends the call to interexchange carrier switch 114. Interexchange carrier switch 114 is a switch on an interexchange network. An interexchange network comprises a plurality of switches that are located throughout a geographic area. However, in contrast to a local exchange network, interexchange networks typically comprise of switches throughout a large geographic area to process long distance telephone calls. For example, a national interexchange network comprises switches throughout the nation.

Interexchange carrier switch 114 completes the call via one or more components within global telecommunications network 118. Global telecommunications network 118 comprises the components shown in FIG. 1 and other global telecommunications network switches and termination equipment 116. Other global telecommunications network switches and termination equipment 116 comprises various interexchange networks that include interexchange carrier switches and various local exchange networks that include central office switches. In addition, other global telecommunications network switches and termination equipment 116 includes other equipment that can be used to access databases, listen to messages, and interconnect with other users using the global telecommunications network 118.

Figure 2:
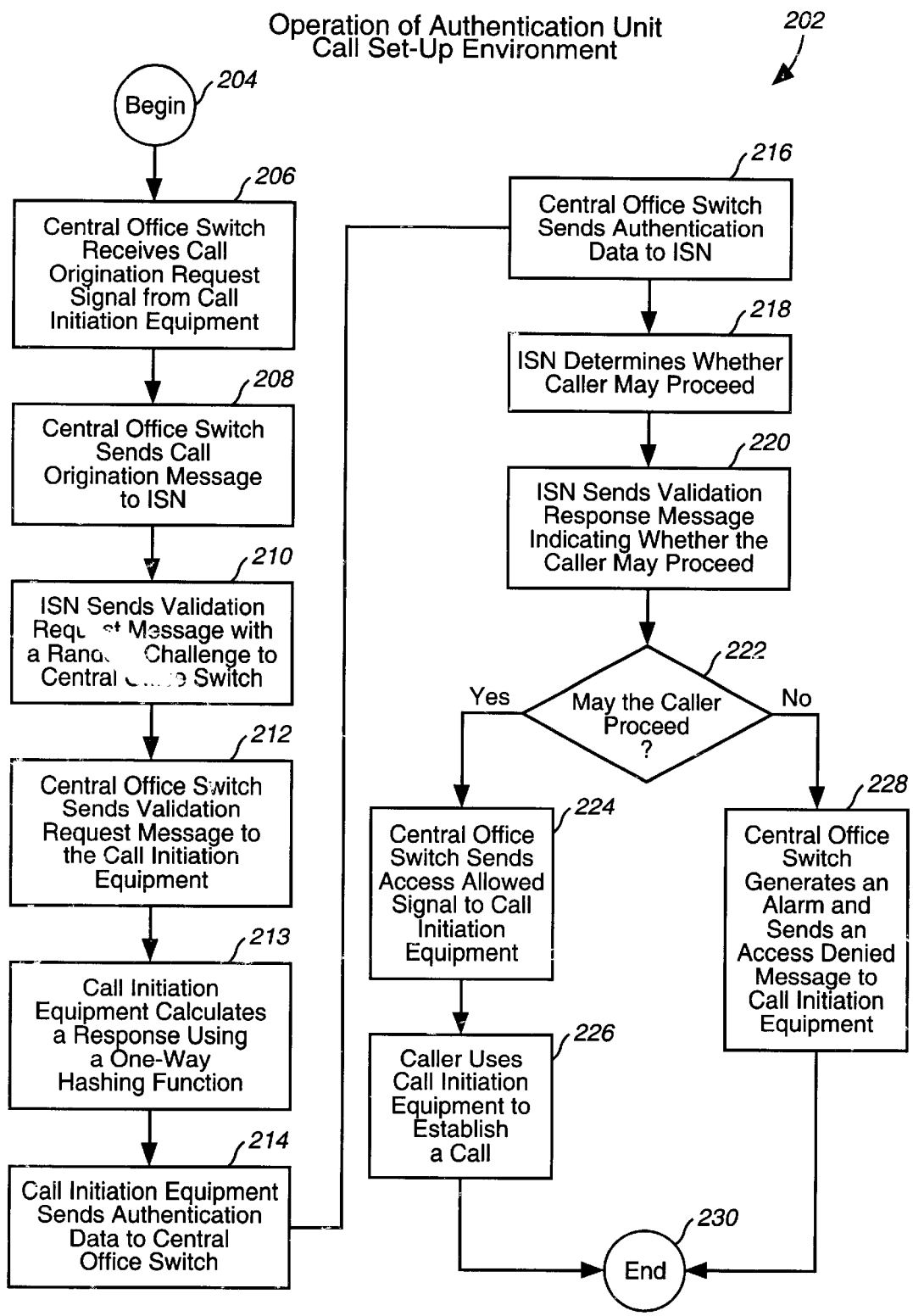
FIG. 2 depicts a flowchart illustrating the operation of an authentication unit call set-up environment according to a preferred embodiment of the present invention.

FIG. 2 depicts a flowchart illustrating the operation of an authentication unit call set-up environment 202. FIG. 2 is described with respect to FIG. 3 which illustrates the messages for authentication unit operation 302. The operation of an authentication unit call set-up environment 202 is described with reference to components of FIG. 1.

In step 206, central office switch 110 receives a call origination request 304 from call initiation equipment 104. A call origination request 304 informs the central office switch 1 10 that the call initiation equipment 104 is initiating a call.

If call initiation equipment 104 is a telephone, the customer preferably effects transmission of the call origination request signal by removing the handset of the telephone from the telephone base. When the handset of the telephone is removed from the telephone base, the telephone sends a call origination request 304 to the interconnecting switch, such as central office switch 110. One example of call origination request 304 is an off-hook signal which is a signal that indicates that the telephone will be used to initiate a call and complies with the International Telecommunications Union (ITU) signaling standards. The International Telecommunications Union (ITU) standards are publicly available as evidenced by the exemplary International Telecommunications Union (ITU) Signaling System Number 7 (SS7) Integrated Services Digital Network (ISDN) User Part (ISUP) NCT 1.113 (1995) document and the International Telecommunications Union (ITU) Signaling system 7 (SS7) Message Transfer Part (MTP) NCT 1.111 (1992) document. Conventionally, the central office switch 110 sends a dial tone in response to the call origination request 304.

However, with the present invention, additional processing is needed before the central office switch 110 sends a dial tone to call initiation equipment 104. Specifically, the call origination equipment 104 must first be authenticated by the adjunct platform, in this embodiment ISN 112, before a dial tone is sent from central office switch 110 to call initiation equipment 104.

In step 208, central office switch 110 sends the call origination request 304 to ISN 112. The call origination request 304 notifies the ISN 112 that the call initiation equipment 104 will be authenticated. The notification provided by the call origination request 304 distinguishes call initiation equipment 104 that will be authenticated from other call initiation equipment that may use conventional methods of call origination not involving authentication. The notification provided in the call origination request 304 allows the central office switch 110 and ISN 112 to provide access to both authenticating call initiation equipment 104 and non-authenticating call initiation equipment simultaneously. In addition, the ISN 112 may perform an initial authentication or identification of call initiation equipment 104 if information is provided in the call origination request 304 for an initial authentication or identification of call initiation equipment 104.

In step 210, the ISN 112 sends a validation request message 306 to central office switch 110. The validation request message 306 requests authentication data 308. Authentication data 308 that includes a random challenge corresponds to call initiation equipment 104 and is used to ensure that the call initiation equipment 104 is authorized to use customer wireline 108. In a preferred embodiment of the present invention, the authentication data 308 includes both a customer wireline identification number which identifies customer wireline 108 and an authentication identification number which is a response unique to call initiation equipment 104 that corresponds to a random challenge provided in the validation request message 306. In contrast to the consistency from call to call of the information that is provided by the call origination request 304 for initial identification or authentication, the authentication data 308 that authenticates the call initiation equipment 104 will vary in response to the validation request message 306 that was sent. Further description of authentication data 308 is given in the description of step 214 and Table 1.

The validation request message 306 will vary from call to call to make it difficult for a person who wants to gain unauthorized access to customer wireline 108 to gain access by interconnecting into the global telecommunications network 118, watching the data transmitting in the global telecommunications network 118, and determining from the data transmission how to respond to the validation request message 306. If the unauthorized individual could determine the appropriate authentication data 308 to respond to a validation request message 306, the unauthorized individual could then transmit the same authentication data 308 as transmitted by call initiation equipment 104 and gain access to customer wireline 108.

One type of validation request message 306 is a random challenge. The random challenge is a stream of digits that are sent in the validation request message 306. When the random digits are sent, the ISN 112 expects a stream of digits in return that correspond to the random challenge. For example, if the ISN 112 sends a validation request message 306 containing a random challenge of a digit stream 11011, the ISN 112 may be expecting authentication data 308 of a digit stream 01111. In contrast, if the ISN 112 sends a validation request message 306 with random challenged digits, 11110, the ISN 112 may be expecting authentication data 308 with digits 11101. As demonstrated in the example above, both the challenge and the response are random. Because the challenge is random, the ISN 112 will not send 00001, 00011 and so forth in sequential order. Because the response is random, the authentication data 308 will not be able to be determined with an algorithm. Therefore, an individual viewing data on an unauthorized interconnection with customer wireline 108, cannot at any given time determine the random challenge that will be sent or the authentication data 308 response needed, and gain access to central office switch 110 via customer wireline 108.

In step 212, the central office switch 110 sends the validation request message received from the ISN 112 to the call initiation equipment 104.

In step 213, the call initiation equipment 104 calculates the response using a one-way hashing function. As mentioned, the authentication data that is used to respond to the validation request message includes a customer wireline identification number and an authentication identification number shown in Table of step 214. The authentication identification number is calculated by call initiation equipment 104.

The authentication unit 106 calculates the authentication identification number using the random challenge in the validation request message 306. Several available algorithms for calculating the authentication identification number include the secure hash algorithm developed by NIST or the MD5 Message Digest algorithm developed by IETF. However, the present invention is not limited to these algorithms. In another embodiment of the invention, the authentication identification number is stored in a database and the authentication unit 106 retrieves the authentication identification number from memory.

In step 214, the call initiation equipment 104 sends authentication data 308 to central office switch 110 which comprises both a customer wireline identification number and an authentication identification number shown in Table 1 below. A customer wireline identification number is a number or other identifying information that is associated with customer wireline 108. If call initiation equipment 104 is a telephone, then the customer wireline identification number is a number that is dialed to terminate to call initiation equipment 104 For example, if a person on global network 116 wants to call a person using call initiation equipment 104, the person on customer network 116 will dial digits into a telephone. The number dialed is the customer wireline identification number.

TABLE 1

| Authentication Data 308 | |
| --- | --- |
| Customer Wireline Identification Number | Identifies customer wireline 108. For example, the customer wireline identification number may be the customer's ANI. |
| Authentication Identification Number | Responds to the validation request message 308. For example, the authentication identification number may be a random digit stream that is calculated using a random challenge provided in the validation request message 308. |

The authentication identification number is the stream of random digits that was calculated in step 213 using the random challenge sent by the ISN 112. As mentioned previously, the ISN 112 expects the call initiation equipment 104 to respond with a unique digit stream corresponding to the digit stream sent in the validation request message 306. In other words, if the ISN sends 00001, the ISN 112 expects an authentication identification number of 10000 from call initiation equipment 104.

In step 216, the central office switch 110 sends the authentication data 308 (received from the authentication unit 106) to the ISN 112.

In step 218, the ISN 112 determines whether the caller may proceed. The ISN 112 compares the authentication data 308 with the authentication data obtained by implementing a stored algorithm that is the same as that used by the call initiation equipment or retrieved from in its database corresponding to call initiation equipment 104. If the authentication data 308 received from call initiation equipment 104 corresponds to authentication data obtained by the ISN 112 as corresponding to call initiation equipment 104, then call initiation equipment 104 is authenticated. If the authentication data required was a customer wireline identification number and an authentication identification number, then if call initiation equipment 104 sent the call initiation equipment identification number that is the same as the number retrieved from memory corresponding to customer wireline 108 and the authentication identification number corresponding to the number calculated using the random challenge, the call initiation equipment 104 is authorized to use customer wireline 108. If the authentication data 308 does not correspond to the authentication data that is needed to authorize call initiation equipment 104 to use customer wireline 108, then the caller may not initiate a call.

In step 220, the ISN 112 sends a validation response message 310 to central office 110 indicating whether the caller may proceed to initiate a call. The validation response message indicates whether call initiation equipment 104 is authorized to use customer wireline 108. If call initiation equipment 104 sent the appropriate authentication data, then call initiation equipment 104 is authorized to use customer wireline 108.

In step 222, the central office switch 110 determines whether the caller may initiate a call. If the validation response message 310 indicates that the call initiation equipment 104 is authorized to use customer wireline 108, the caller may initiate a call. If the caller may initiate a call, central office switch 110 proceeds to step 224. If the caller may not initiate a call, the central office switch 110 proceeds to step 228.

In step 224, central office switch 110 sends an access allowed signal 312 to call initiation equipment 104. An access allowed signal 312 indicates to the call initiation equipment 104 or the caller that a call may be initiated. An access allowed signal 312 varies depending on the type of call initiation equipment used. For example, if call initiation equipment 104 is a telephone, then the access allowed signal 312 may be a dial tone. If call initiation equipment 104 is a personal computer, the access allowed signal 312 may be a message requesting that a destination number be entered.

In step 226, the caller uses call initiation equipment 104 to establish a call. If call initiation equipment 104 is a telephone, the caller will use the keys to dial and place a call. If call initiation equipment 104 is a personal computer, the caller will either enter a destination number 314, or the computer will dial an already entered number to a destination, such as a personal computer of another individual. The digits dialed may be a destination number 314 which is a number associated with a second customer wireline within a network of the other global telecommunication network switches and termination equipment 116. The second customer wireline interconnects to call initiation equipment that receives the call. Messages are sent between the components of global telecommunications network 118 to establish and monitor the call. The messages that are used to communicate between components of the global telecommunications network 118 comply with the industry standard as defined by the International Telecommunications Union (ITU) mentioned previously.

In step 228, central office switch 110 generates an alarm and sends an access denied message to call initiation equipment 104 to deny the customer access to the global telecommunications network 118. If call initiation equipment 104 is a telephone, the access denied message may be a recording that states that a call cannot be placed because call initiation equipment 104 is not authorized to use customer wireline 108. If call initiation equipment 104 is a personal computer, the access denied message may be a message on the screen of the personal computer stating that the customer is not allowed access.

In addition to sending an access denied message, the central office switch 110 generates an alarm in step 228. The central office switch 110 sends the alarm to downstream systems that process alarms. The downstream systems that process alarms watch various circuits within the telecommunications network such as, customer wireline 108 to determine if a large number of alarms are generated for a particular circuit. Observing alarms alerts a telecommunications provider that an unauthorized user is attempting to access customer wireline 108. For example, if a large number of alarms are generated for a particular circuit, this alerts a telecommunications provider that a party may be attempting to determine based on the transmitted data between call initiation equipment 104 and ISN 112, the appropriate authentication data to respond to a random challenge. If a large number of alarms are generated, this can alert the telecommunications provider to alert the owner of customer wireline 108. In addition, the telecommunications provider can focus efforts in establishing that an unauthorized interconnection is the cause of the alarms, and if so, unauthorized interconnection is being made.

Alternate embodiments of the present invention are possible. One alternate embodiment, described with reference to components of FIG. 1, is that central office switch 110 is not connected to ISN 112. Rather, interexchange carrier switch 114 is connected to ISN 112. If interexchange carrier switch 114 is interconnected to ISN 112, central office switch 110 sends messages received from call initiation equipment 104 to interexchange carrier switch 114 rather than ISN 112.

With respect to FIG. 2, if ISN 112 is interconnected to interexchange carrier switch 114 rather than central office switch 110, then in step 208, after the central office switch receives the call origination request 304, the central office switch 110 will send the call origination request 304 to interexchange carrier switch 114 rather than to ISN 112. Interexchange carrier switch 114 will send the call origination request 304 to ISN 112.

With respect to step 210 of FIG. 2, ISN 112 will send a validation request message 306 to interexchange carrier switch 114. Interexchange carrier switch 114 will send a validation request message 306 to central office switch 110.

In step 216 of FIG. 2, the central office switch 110 will send authentication data 308 to interexchange carrier switch 114. Interexchange carrier switch 114 will send the authentication data 308 to ISN 112.

In step 220 of FIG. 2, the ISN 112 will send a validation response message 310 indicating whether the caller may proceed to interexchange carrier switch 114. Interexchange carrier switch 114 will send a validation response message 310 to central office switch 110.

Additional embodiments include additional exchanges used to transmit the validation request and response messages and authentication data In addition, the central office switch 110 may be connected directly to global network 116 rather than or in addition to interexchange network 114. If the central office switch 110 is connected directly to global network 116, then the central office switch 110 may send some or all calls directly to global network 116.

An additional alternate embodiment as stated previously, is the authentication unit 106 does not need to be within call initiation equipment 104. However, authentication unit 106 should be as close as possible to call initiation equipment 104 to insure that an unauthorized user cannot interconnect between call initiation equipment 104 and authentication unit 106. For example if authentication unit 106 was a box, authentication unit 106 should sit next to the personal computer, telephone or other piece of call initiation equipment 104 that will be used to place the call. Authentication unit 106 should not be downstairs in a basement of a building or outside on a telephone pole because an unauthorized user would have the ability to interconnect between call initiation equipment 104 and authentication unit 106 and gain access via authorization unit 106 to place calls via customer wireline 108.

In addition, authentication unit 106 need not be a separate unit. If call initiation equipment 104 is a personal computer, authentication unit 106 may be a program or a routine of a program on that computer or that can be accessed by the computer that can send the appropriate signals and authentication data to establish a call. A separate component within the computer may not be necessary.

In another embodiment, the adjunct platform is not ISN 112 but another platform or database that is capable of sending validation request and response messages and analyzing authentication data to ensure call initiation equipment 104 is authorized to use customer wireline 108. Also, the adjunct platform may be a database within either central office switch 110 or interexchange carrier switch 114. If the adjunct platform is a database within central office switch 110 or interexchange carrier switch 114, the exchange including the adjunct platform would send the validation request and response messages rather than waiting for them to be sent. In addition, the exchange would analyze the authentication data based on information contained in its database rather than sending the authentication to another exchange or to the adjunct platform.

A variety of call origination requests 304, validation request messages 306, authentication data 308, and validation response messages 310 are possible that provide massaging between the global telecommunication network 118 and the call initiation equipment 104. Not all of the messages are required to authenticate call initiation equipment 104. A validation response message 310 may be an access allowed signal 312 or an access denied signal, especially if the adjunct platform is contained within an exchange. In addition, authentication data 308 may be provided without responding to a validation response message 310 if a random challenge authentication is not used.

While various embodiments of the present invention have been described above, it should be understood that they have been presented by way of example only, not limitation. Thus, the breadth and scope of the present invention should not be limited by any of the above-described exemplary embodiments, but should be defined only in accordance with the following claims and their equivalents.

What is claimed is:

1. A communications device for establishing a call over a customer wireline disposed between a customer and a central office switch, the device comprising:
   a call initiation device coupled to the customer wireline, the call initiation device being operative to transmit an origination request signal, whereby the call initiation device notifies the central office switch of its request for authentication; and
   an authentication circuit confuted to the call initiation device, the authentication circuit being operative to generate authentication data by processing a validation request received from the central office switch, and transmit the authentication data in response to the validation request without customer intervention.

2. The system of claim 1, wherein the communications device includes a telephone.

3. The system of claim 1, wherein the communications device includes a computer.

4. The system of claim 1, wherein the communications device includes a wireless telephone.

5. The system of claim 1, wherein the customer wireline includes at least one metallic cable.

6. The system of claim 1, wherein the customer wireline includes at least one fiber optic cable.

7. The system of claim 1, wherein the customer wireline includes a frequency assignment of a radio frequency signal.

8. The system of claim 1, wherein the authentication circuit includes a state machine.

9. The system of claim 1, wherein the authentication circuit includes a microprocessor.

10. The system of claim 9, wherein the microprocessor includes a memory for storing the authentication data in a look-up table.

11. The system of claim 9, wherein the microprocessor performs an algorithm to derive the authentication data.

12. The system of claim 11, wherein the algorithm performed by the microprocessor is a secure hash algorithm.

13. The system of claim 11, wherein the algorithm performed by the microprocessor is a Message Digest algorithm.

14. The system of claim 9, wherein the authentication data includes a customer wireline identification number.

15. The system of claim 9, wherein the authentication data includes an authentication identification number.

16. A communications device for establishing a call over a customer wireline disposed between a customer and a central office switch, the device comprising:
   a call initiation device coupled to the customer wireline, the call initiation device being operative to transmit an origination request signal, and receive a validation request transmitted from the central office in response to the origination request signal; and
   a processor coupled to the call initiation device, the processor being operative to generate an authentication identification number in response to the validation request, assemble and transmit a digital transmission including the authentication identification number and a customer wireline identification number corresponding to, the customer wireline, whereby the processor generates, assembles, and transmits in response to the validation request without customer intervention.

17. The system of claim 16, wherein the communications device does not include a card reading apparatus.

18. The system of claim 16, wherein the processor includes a state machine.

19. The system of claim 16, wherein the processor includes a microprocessor.

20. The system of claim 10, wherein the call initiation device and the processor are disposed within an equipment housing.

21. A telecommunications network for preventing clip-on fraud, the telecommunications network including a customer wireline connecting a communications device and a central office switch, the telecommunications network comprising:
   a call initiation device disposed within the communications device, the call initiation device being operative to transmit an origination request signal;
   a validation request generator coupled to the central office, the validation request generator being operative to issue a random challenge validation request in response to the origination request signal;
   an authentication unit disposed within the communications device and coupled to the call initiation device, the authentication unit being operative to transmit a digital transmission in response to the validation request without customer intervention, the digital transmission including an authentication identification number and a customer wireline identification number; and
   an authentication evaluation element coupled to the central office, the authentication evaluation element being operative to compare the digital transmission to authentication data corresponding to the random challenge validation request.

22. A method for authenticating a communications device, the communications device being coupled to a central office switch by a customer wireline disposed between a customer and the central office switch, the method comprising the steps of:
   a) transmitting an origination request signal;,
   b) transmitting a validation request from the central office to the communications device in response to the origination request signal;
   c) generating a digital authentication data processing the validation request message; and
   d) transmitting the digital authentication data to the central office, whereby steps c), and d) are performed without human assistance.

23. The method of claim 22, wherein the validation request is a random challenge.

24. A The method of claim 22, further comprising the steps of:
   transmitting an access allowed signal from the central office to the communications device in response to the digital authentication data; and
   providing access to the customer wireline, whereby communications between the central office and the communications device are established.

25. The method of claim 24, wherein the step of providing includes providing dial tone to the communications device.

26. The method of claim 22, further comprising the steps of:
   transmitting an access denied signal from the central office to the communications device in response to the digital authentication data; and
   generating an alarm signal, whereby the central office notifies a network authority of an access denied condition.

27. The method of claim 22, wherein the step of generating digital authentication data includes performing a secure hash algorithm.

28. The method of claim 22, wherein the step of generating digital authentication data includes performing a message digest algorithm.

29. The method of claim 22, wherein the step of generating digital authentication data includes assembling an authentication identification number and a customer identification wireline number.

30. A method for preventing clip-on fraud in a telecommunications network, the telecommunications network including a customer wireline coupling a communications device with a central office switch, the method comprising the steps of:

transmitting an origination request signal, wherein the central office is notified of a request for authentication;

generating a random challenge validation number in response to the origination request signal;

generating an authentication identification number by processing the random challenge validation number;

transmitting the authentication identification number and a customer wireline identification number from the call initiation device to the central office without customer assistance; and comparing the digital transmission to authentication data corresponding to the random challenge validation number to thereby determine if the call initiation is authorized by the customer.

* * * * *